(12) United States Patent
Faulkner

(10) Patent No.: US 12,047,464 B1
(45) Date of Patent: Jul. 23, 2024

(54) CONTROLLED DELIVERY OF ACTIVITY SIGNALS FOR PROMOTION OF USER ENGAGEMENT OF SELECT USERS IN COMMUNICATION SESSIONS

(71) Applicant: MICROSOFT TECHNOLOGY LICENSING, LLC, Redmond, WA (US)

(72) Inventor: Jason Thomas Faulkner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/091,301

(22) Filed: Dec. 29, 2022

(51) Int. Cl.
| | | |
|---|---|---|
| G06F 15/16 | (2006.01) | |
| H04L 67/306 | (2022.01) | |
| H04L 67/50 | (2022.01) | |
| H04L 67/55 | (2022.01) | |

(52) U.S. Cl.
CPC .......... H04L 67/535 (2022.05); H04L 67/306 (2013.01); H04L 67/55 (2022.05)

(58) Field of Classification Search
CPC ...... H04L 67/535; H04L 67/55; H04L 67/306
USPC ........................................................ 709/204
See application file for complete search history.

(56) References Cited

U.S. PATENT DOCUMENTS

| | | |
|---|---|---|
| 5,852,656 A | 12/1998 | Sato et al. |
| 9,319,442 B2 | 4/2016 | Griffin et al. |
| 9,652,113 B1 | 5/2017 | Colson et al. |
| 10,693,824 B2 | 6/2020 | Silva et al. |
| 10,986,136 B1 * | 4/2021 | Natarajan ........... H04L 43/0876 |
| 11,163,789 B2 | 11/2021 | Taylor et al. |
| 11,270,697 B2 | 3/2022 | Bar-on et al. |
| 11,271,978 B2 | 3/2022 | Ranalli et al. |
| 11,336,706 B1 | 5/2022 | Saito et al. |
| 2018/0007150 A1 * | 1/2018 | Deopura ................. H04W 4/23 |
| 2018/0337963 A1 | 11/2018 | Faulkner et al. |

(Continued)

FOREIGN PATENT DOCUMENTS

JP 2010128811 A 6/2010

OTHER PUBLICATIONS

"Real Time Highlights", Retrieved from: https://listener.app/features/real-time-highlights, Retrieved Date: Sep. 2, 2022, 6 Pages.

(Continued)

*Primary Examiner* — Alan S Chou
(74) *Attorney, Agent, or Firm* — Scott Y. Shigeta; Newport IP, LLC

(57) ABSTRACT

The disclosed techniques provide controlled delivery of stimulus notifications for promotion of user engagement of select users in communication sessions. A system delivers stimulus notifications targeting less-engaged attendees who is already in an event, such as a meeting. The stimulus notifications can be regarding happenings from different corners of the event that match the attendee's profile. For example, if the attendee has a profile that indicates they are interested in viewing their team members in an event where they are participating in an activity related to a predetermined sentiment, e.g., a positive sentiment such as performing a cheering gesture or generating specific emojis, the system will send that attendee stimulus notifications when that attendee has a low engagement level.

20 Claims, 7 Drawing Sheets

(56) References Cited

U.S. PATENT DOCUMENTS

| | | | |
|---|---|---|---|
| 2021/0021439 A1* | 1/2021 | Gorny | H04L 12/1822 |
| 2021/0399911 A1* | 12/2021 | Jorasch | H04L 12/1822 |
| 2022/0103566 A1 | 3/2022 | Faulkner | |

OTHER PUBLICATIONS

International Search Report and Written Opinion received for PCT Application No. PCT/US23/036985, Feb. 7, 2024, 12 pages.

* cited by examiner

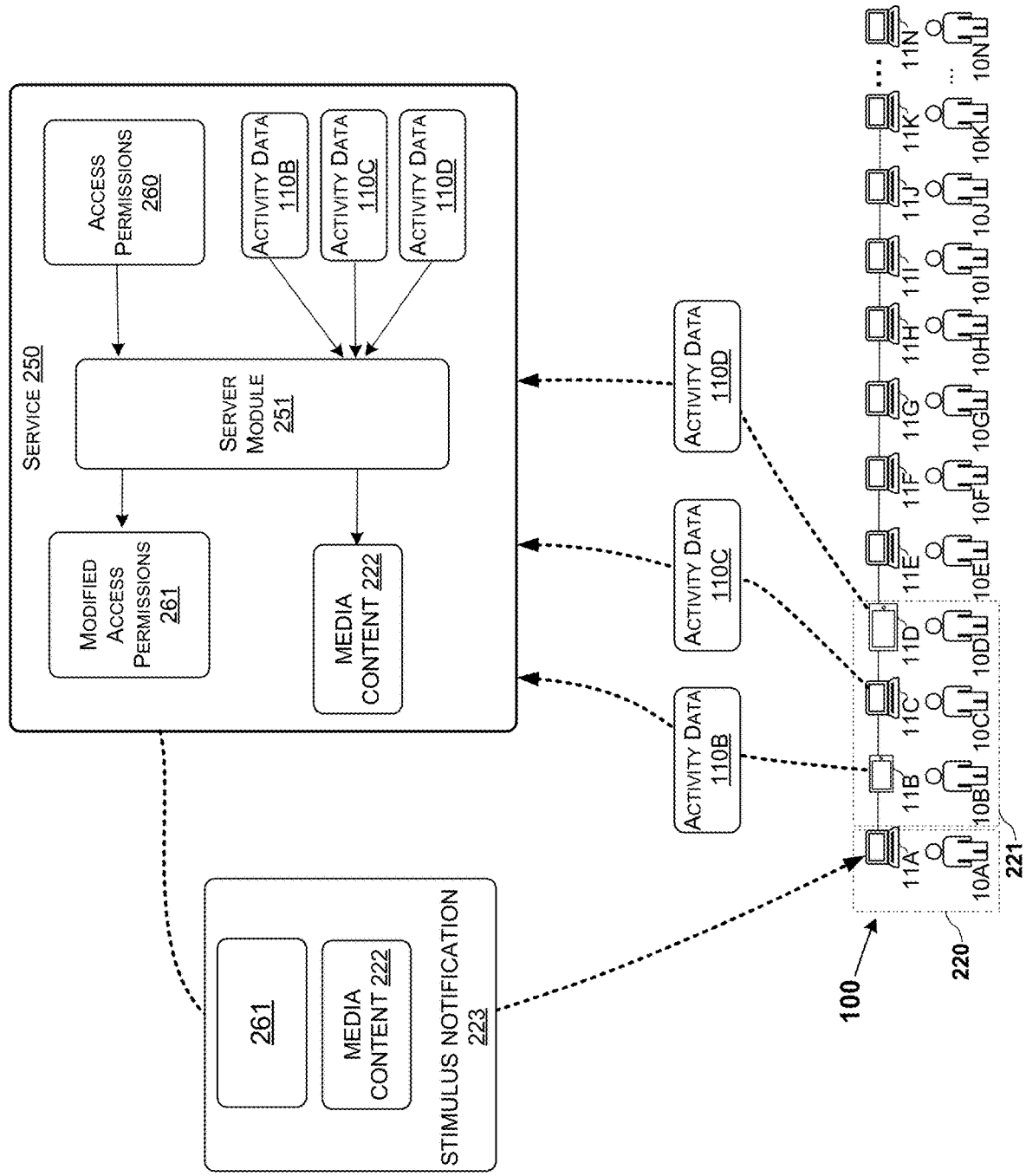

CONTROLLED DELIVERY OF ACTIVITY SIGNALS FOR PROMOTION OF USER ENGAGEMENT OF SELECT USERS IN COMMUNICATION SESSIONS

BACKGROUND

There are a number of different types of collaborative systems that allow users to communicate. For example, some systems allow people to collaborate by sharing content using video and audio streams, shared files, chat messages, etc. Some systems provide user interface formats that allow users to share content with an audience. Such systems can provide specific sets of permissions that allow users to take specific roles, such as a presenter, audience member, etc.

Although some collaborative systems can provide a platform for a number of users to share live video streams and audio streams using specific sets of permissions for users to take on certain roles, such systems have a number of drawbacks. For instance, when it comes to large group experiences such as all-hands meetings, concerts, and sporting events, social events, and conference sessions, large events depend on good attendance. Moreover, in large group experiences, audience retention is also important. The experience as a whole is drastically reduced when people leave or a forum seems too large for an intended audience size. A poor user experience or poor retention leads to a loss of user awareness and user engagement, which can greatly detract from the effectiveness of an event and overall failure of the intended communication of vital information. These issues a greatly exacerbated when an event involves large groups, e.g., hundreds or thousands of users.

When a system does not provide a virtual environment for an online meeting, users may not share the same experience, or benefit from a team-building experience. The users may miss salient information and gestures, which can lead to a loss of communication of information and enthusiasm. These shortcomings can lead to ineffective interactions between a computing device and a user. In addition, the above-described shortcomings of existing systems can lead to a loss in user engagement. Being part of a group in a large virtual environment is important for each member of a team to see the energy of the team and for motivation and engagement in a meeting and overall productivity. Improved user engagement can also help improve the efficiency of computing systems as well. In addition, proper control of permissions managing the views of a virtual environment is also important for securing confidential information. This is especially important for events where competing teams are participants in a virtual meeting and different views are generated for each person.

Computing devices that do not promote user engagement, or worse, contribute to a loss of user engagement, can lead to production loss and inefficiencies with respect to a number computing resources. For instance, when a user becomes fatigued or disengaged, that user may need to refer to other resources, such as documents or participate in other forms of communication, when shared content is missed or overlooked. Missed content may need to be re-sent when viewers miss salient points or cues during a live meeting. Such activities can lead to inefficient or duplicative use of a network, processor, memory, or other computing resources. Thus, there is an ongoing need to develop improvements to help make the user experience more like an in-person meeting and/or more engaging. In addition, when information in metaverse environments is not displayed correctly or at the right time, such systems may not identify the best time to optimize the delivery of a notification or a reminder. There is a continual need to improve the way systems use contextual data and user scenarios to optimally provide notifications and reminders.

SUMMARY

The techniques disclosed herein provide controlled delivery of stimulus notifications for promotion of user engagement of select users in communication sessions. The stimulus notifications can include the communication of content, images, videos, emojis, movement data, gestures, location information, or any other form of data that indicates a predetermined sentiment during an online meeting and/or virtual environment. In some configurations, in a metaverse environment, a system delivers stimulus notifications targeting less-engaged attendees who is already in an event, such as a meeting. In some configurations, people who are invited but are not yet in attendance are restricted from receiving the stimulus notifications. The stimulus notifications can be regarding happenings from different corners of the event that match the attendee's profile. For example, if the attendee has a profile that indicates they are interested in viewing their team members in an event where they are participating in an activity related to a predetermined sentiment, e.g., a positive sentiment such as performing a cheering gesture or generating specific emojis, the system will send that attendee stimulus notifications when that attendee has a low engagement level.

In some configurations, a system provides stimuli notifications of live content highlights to less engaged users, e.g., users that need motivation. For users already in an event, e.g., joined a live meeting, the system detects and classifies users who are associated with low activity. These users are classified as a passive group or a low activity group. This low activity group can be referred to herein as users that need motivation or the "less engaged users." In some embodiments, the low activity group can include invited users but haven't joined the event yet. In other embodiments, the low activity group does not include invited users who haven't joined the event yet. Then, based on profiles of the low activity group, the system identifies respective "higher than threshold activities" that match the respective profiles of the identified users, and for each respective identified user, the system curates and compiles a highlight of video of the activities that match the respective user and delivers the respective highlight to each respective identified user. In some configurations, the profile can include a social graph, contact list, interests, or the like. In illustrative example, the activity-user match is based on having a person that the identified user knows (same team, contact list, etc.) involving in the identified activity. In this case, the packaged highlight will include information of the person and an embedded control, e.g., to call or message, for the identified user to contact that person.

In some embodiments, media is only compiled when three conditions are detected: someone has to be at a low participation level (the designated recipient of the media), another person or a group of people have to be high participation (generated media to be delivered depicts the high participation group), and the activity of the high participation group needs to match the profile of the designated recipient who is at a low participation level.

By sending activity data to select users in response to the criteria described herein, the system can preserve computing resources by only generating media when two or more conditions are detected. This way, a system only generates content media when it is needed for optimal communication to the notification recipients. The disclosed techniques provide a targeted delivery system that saves computing resources by only generating new media when a first set of users is less attentive, and a second set of users is active. In addition to promoting user retention, the disclosed techniques generate targeted media using computationally efficient processes.

The system also promotes security by controlling permissions for the media that is generated and delivered to targeted recipients. In some embodiments, permissions are activated for targeted users that are selected in response to the detection of low activity. The permissions are set to allow the targeted users to receive and view the generated media and other users that are not determined to be low activity are restricted from receiving the generated media. By changing permissions in response to the detection an event meeting a preset condition, e.g., when some users are disengaged and when the sentiment is high for other groups of people, the system can allow a select set of users to obtain permission to receive new combinations data, while the permissions specifically restrict other users from receiving the new combinations data. When the system determines that the event no longer meets the preset condition, the system can revoke the granted permissions while also maintaining the restriction on other users from receiving the generated media.

The disclosed features also help improve user engagement and retention by providing new combinations of content that is generated in response to the detection of a combination of low user activity and high user activity. Showing information at the right time using these triggers also helps recapture a person's attention by delivering media at the optimal time. This timing helps bring the low activity user back to details at optimal delivery times, e.g., when some users are disengaged and when the sentiment is high for other groups of people.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2 shows aspects of a system in the process of generating media for providing controlled delivery of stimulus notifications for promotion of user engagement of select users.

DETAILED DESCRIPTION

Figure 1:
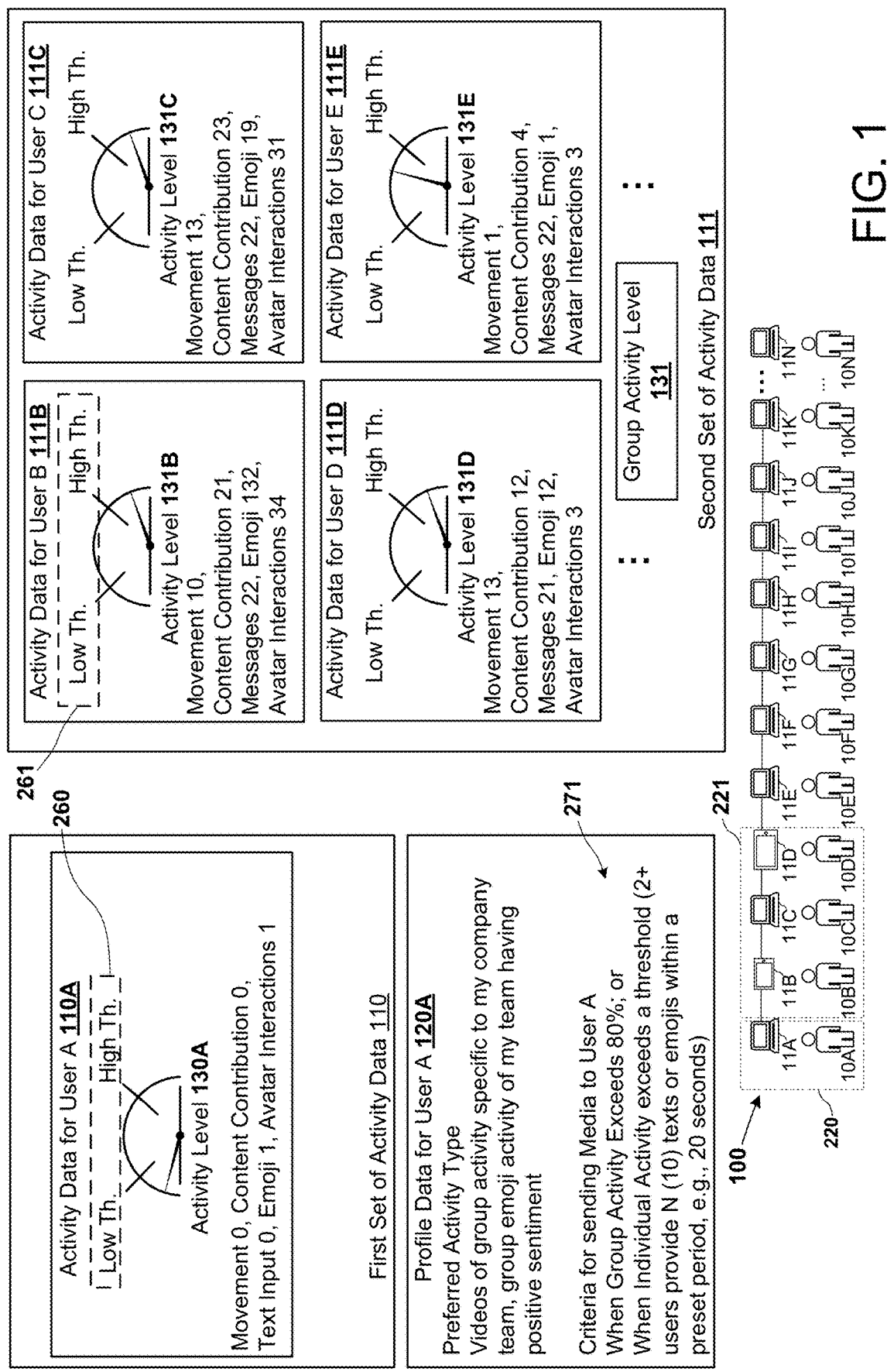
FIG. 1 is a block diagram of a system and supporting data for providing controlled delivery of stimulus notifications for promotion of user engagement of select users in communication sessions.

FIG. 1 illustrates aspects of a system 100 that provides controlled delivery of stimulus notifications for promotion of user engagement of select users in communication sessions. A communication session can be in the form of an online meeting where video streams and audio streams are shared between users 10 of the system 100. The system 100 can include a number of computers 11 each corresponding to individual users 10 that are interacting with the computers 11. For illustrative purposes, a first user 10A is associated with a first computer 11A, a second user 10B is associated with a second computer 11B, and other users are associated with other individual computers, up to the Nth User 10N, who is interacting with the Nth computer 10N. These users can also be respectively referred to as "User A," User B," etc. The computers 11 can be in the form of desktop computers, head-mounted display units, tablets, mobile phones, etc. This example is provided for illustrative purposes, and it is not to be construed as limiting. It can be appreciated that the system can include any number of users and any number of devices.

As shown in FIG. 1, the system uses different sets of data that each define aspects of user activity and user profile data. For instance, a first set of activity data 110 can include one or more values that quantify as an activity level 130A for the first user. In addition, activity data 110A that is specific to the first user can describe activity and values quantifying the activity. For instance, the activity for the first user can indicate how much a person has moved within a live video stream. A system can direct a camera to a user, such as the first user 10A, and detect that user's movement, including how many times that person raises their hand, how often they speak, a description of their eye movement, etc. The activity data can also indicate the amount of content that is shared by that first user. For instance, this can be a quantity that identifies a number of files or a quantity of data that's shared which can be quantified in bytes, a number of pages, a number of documents, etc. The activity data can also indicate a number of messages, count of text characters, or a number of emojis that are shared by a person and/or provided to a chat thread or other forum. The activity data can also indicate a number of avatar interactions. For instance, if a user is interacting in a 3D environment what other users come up and that user controls their avatar to approach other avatars, that type of can be described and quantified in the activity data.

The profile data 120A for the first user 10A can define preferences indicating when the first user would like to see stimulus notifications. In this example, the profile data 120A includes a list of preferred activity, e.g., a type of activity that they prefer to see in the Stimulus notifications. In this example, the first user prefers to receive videos specific to their team. The team and members of a team can be verified by organizational data such as an org chart. In this example, the profile data also indicates that the first user prefers to see emojis produced by their team, and more specifically emojis that convey a positive sentiment, e.g., smiling, laughing, hearts, thumbs, up, etc. this profile format allows each user to configure preferences for stimulus notifications they prefer to see. in this example, this allows the first user to filter other stimulus that may not motivate them such as a "thumbs down" emoji or celebration activity of other teams. The profile data can also define criteria for events where media is sent to that user. An event can be an announcement or mention of a group of people, activity of a group of people, e.g., their reaction to an announcement, such as movement of an avatar, gestures of an avatar, emojis sent by members of the group, or text or voice streams sent by members of the group, etc.

For instance, the criteria 271 defined in the first users profile data 120A, indicates that they only want to see stimulus notifications when 80% of their team is participating in a particular activity, e.g., celebrating or providing positive emojis. This way, if fewer than a threshold number of people from their team are participating in a particular activity, e.g., an event, such as a celebration or sending positive emojis, the system will not generate the stimulus notification for the first user. This particular example also shows criteria that includes activity of a single user. More specifically, the first user 10A has defined criteria that allows the system to generate a stimulus notification when an individual provides a threshold number of emojis or messages, or a threshold number of emojis or messages within a predetermined time period, e.g., an input rate.

Also shown in FIG. 1, the system can receive and process activity data for other users, such as the activity data 111B for the second user 10B, User B, the third user 10C, User C, etc. This data can also include activity measurements for each user. For instance, a second set of activity data 111 can include one or more values that quantify as an activity level 130B for the second user 10B. Activity data 110A that is specific to the first user can describe a type of activity and values quantifying the activity. For instance, the activity for the first user can indicate how much a person has moved within a live video stream. A camera directed toward to a user, such as the first user 10A, can detect that user's movement, including how many times that person raises their hand, how often they speak, a description of their eye movement, etc. The activity data can also indicate the amount of content that is shared by that first user. For instance, this can be a quantity that identifies a number of files or a quantity of data that's shared which can be quantified in bytes, a number of pages, a number of documents, etc. The activity data can also indicate a number of messages, count of text characters, or a number of emojis that are shared by a person and/or provided to a chat thread or other forum. The activity data can also indicate a number of avatar interactions. For instance, if a user is interacting in a 3D environment what other users come up and that user controls their avatar to approach other avatars, that type of can be described and quantified in the activity data.

In one illustrative example, the controlled delivery of a stimulus notification for promotion of user engagement of select users includes operations for identifying a user or a group of users with a low activity level. The users with a low activity level are identified as the recipients of the stimulus notification. One example is shown in FIG. 1, where on the upper left section shows a first activity level 130A for a first user 10A, e.g., User A, that is part of a first set of activity data 110. The operations for generating a stimulus notification can include the generation, or receipt, of the first set of activity data 110 from a first computing device 11A associated with a first user 10A. In this example, this first set of activity data 110 indicates a first activity level 130A associated with the first user 10A that meets a first preset condition 260. This determination can be made by analyzing the activity data 110A associated with the first user. This can include any type of activity associated with the first user. For instance, it can include the user's physical movement captured in a video camera, a quantity of content contributed by the first user, messages, text or emojis that are provided by the first user, or activity of a representation, such as the movement of an avatar.

In one example, the system can determine that the first activity level 130A meets a first preset condition 260 when one or more select measurements is below a first threshold. In this example, the preset condition 260 includes a low threshold ("Low Th."). The first activity level 130A meets the first preset condition 260 when one or more of the measurements of the corresponding user (User A), e.g., a number of hand raise inputs, a quantity of content, movement of an avatar or the user, or a number of voice inputs is below the low threshold, are below the low threshold. In some embodiments, the low threshold used for detecting inactive users is also referred to herein as the inactive threshold level. Thus, an inactive user is detected when an activity level is below the inactive threshold level. The identification of low activity users, e.g., also referred to herein as "inactive users," can include one or more meeting attendees that meet this first preset condition 260. The Inactive users are also referred to herein as a first subset 220 of users, which is also referred to herein as inactive users, low activity users, or variations thereof.

When multiple measurements are utilized, the system can utilize any combination of the measurements, which can include averaging, summing or any what type of combination of the measurements to generate a first activity level 130A for comparison with a threshold. The threshold can be also set by the user and stored in the profile data as criteria or a low threshold.

As described in more detail below, the high threshold "High Th." is used to determine if the first user is participating as a high activity attendee, e.g., an "active user." If this threshold is exceeded by the first user 10A, the system can then generate media content based on the activity of the user for a stimulus notification to be delivered to other Low Activity attendees, e.g., the "inactive users."

The operations for generating a stimulus notification can include operations for identifying a user or a group of users with a high activity level. Users that are determined to be high activity participants are selected as the subjects to be depicted or described in a stimulus notification. Users who do not meet the criteria for high activity users, are not part of the stimulus notification. One example is shown in FIG. 1, where on the upper right section shows a first activity level 131B for a second user 10B, e.g., User B, that is part of a first set of activity data 110. The operations for generating a stimulus notification can include the generation, or receipt, of a second set of activity data 111 from a subset of computing devices 11B-11D associated with a subset 221 of users 10B-10D. In this example, the second set of activity data 111 indicates a second activity level 131 that meets a second preset condition 261.

In one example, for User B, the system can determine that the second activity level 131B meets the second preset condition 261 when one or more select measurements is above a second threshold. In this example, the preset condition 261 includes a high threshold ("High Th."). The second activity level 131 meets the second preset condition 261 when one or more of the measurements of the corresponding user, e.g., a number of hand raise inputs, a quantity of content, movement of an avatar or the user, or a number of voice inputs, is above the high threshold, is a above a threshold, e.g., the high threshold. In some embodiments, the high threshold used for detecting active users is also referred to herein as the active threshold level. Thus, an active user is detected when an activity level is above the active threshold level.

When multiple measurements are utilized, the system can utilize any combination of the measurements, which can include averaging, summing or any type of combination of the measurements to generate a second activity level 131B to be compared against at threshold for a particular user, such as User B. In this example, User B, User C and User D all have activity data that indicates they are high activity users. In this case, User E is not a high activity user. Thus, User B, User C and User D are selected for the subset of users 221 and determined to be the active users, and User E is not included in the subset of users because that user does not meet the criteria for the threshold of a high activity user. Thus, User E is not an active user. The second subset 221 of users is referred to herein as active users, high activity users, the subset 221 of active users, or variations thereof. User E can become an active user as soon as the activity data meets the one or more second preset conditions 261, which can include an activity score threshold or any other value that defines a threshold for an activity level.

The operations for generating a stimulus notification can include operations for determining that the second set of activity data 111 from the subset of computing devices of the subset of users 221 meets one or more criteria with respect to a profile 120A of the user 10A. As shown, the profile data of the First User 10A, e.g., the "inactive user," indicates that the user only wants stimulus notifications video of people on his team cheering with a positive sentiment. Given these preferences, in some embodiments, the system only delivers stimulus notifications when that activity is detected. Thus, not only do users have to be identified as active users, that activity is not delivered to a person unless that activity meets criteria of the recipient's profile. In this example, the profile for the first user indicates preferred activity that they wish to view in a stimulus notification, and the profile indicates criteria that defines events that trigger the generation and delivery of a stimulus notification. For example, a stimulus notification is only to be delivered to the first user when group activity exceeds 80%, e.g., when 80% or more of their teammates verified within an org chart or participating in an activity, e.g., 80% or more are cheering or performing the same activity or same gestures, the system will generate and send a stimulus notification to the first user. In addition, when individual activity of a person meets another threshold, a person sends a predetermined number of text messages or emojis within a period of time (e.g., a rate of inputs exceeds a rate threshold), the system will generate and send a stimulus notification to the first user. These examples are provided for illustrative purposes and is not to be construed as limiting. It can be appreciated that other criteria and preferences can be utilized in the profiles for controlling the type and the timing of the stimulus notifications. Some users like to have delivery of text messages while others like to see video renderings of activity of active users. These types of preferences can be defined in each profile.

As shown in FIG. 2, the system can generate and send content media to the inactive users, e.g., the First User 10A, when group activity meets condition for user profile. Thus, in response to determining that the first activity level 130A meets the first preset condition 260, e.g., the first user is inactive, and in response to determining that the second set of activity data 111 from the subset of computing devices meets one or more criteria 271 with respect to a profile 120A of the user 10A, e.g., User A's conditions are met, the system can generate media content 222 indicating user activity associated with the subset 221 of users 10B-10D affiliated with the second set of activity data 111 indicating the second activity level that meets the one or more criteria 271 with respect to the profile 120A of the user 10A. The system can then communicate the media content indicating user activity associated with the subset 221 of users 10B-10D to the first of computing device 11A of the first user 10A that is associated with the first activity level 130A that meets the first preset condition 260.

Figure 3A:
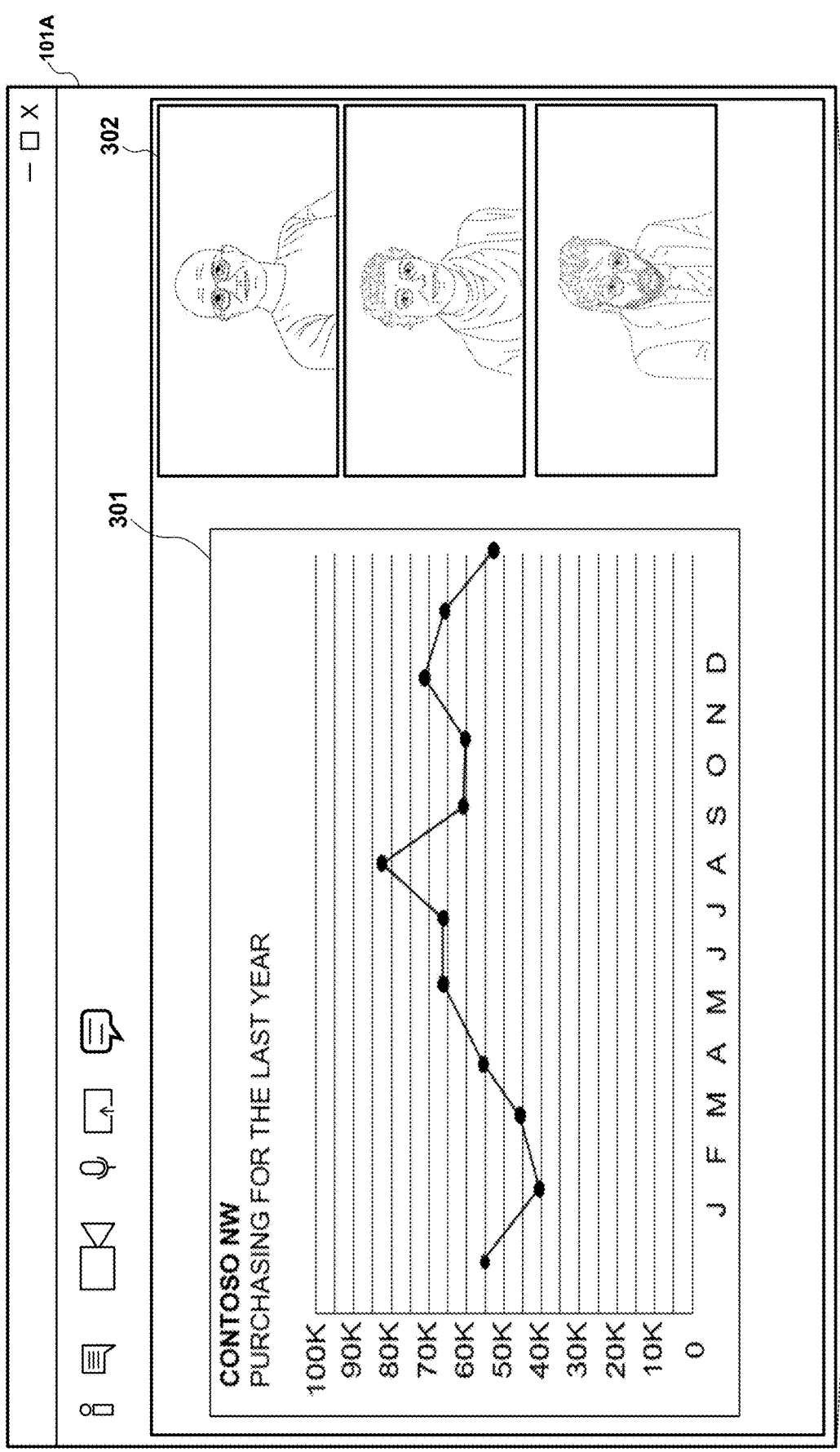
FIG. 3A shows a first user interface arrangement having a content display region and a presenter video display region.
Figure 3B:
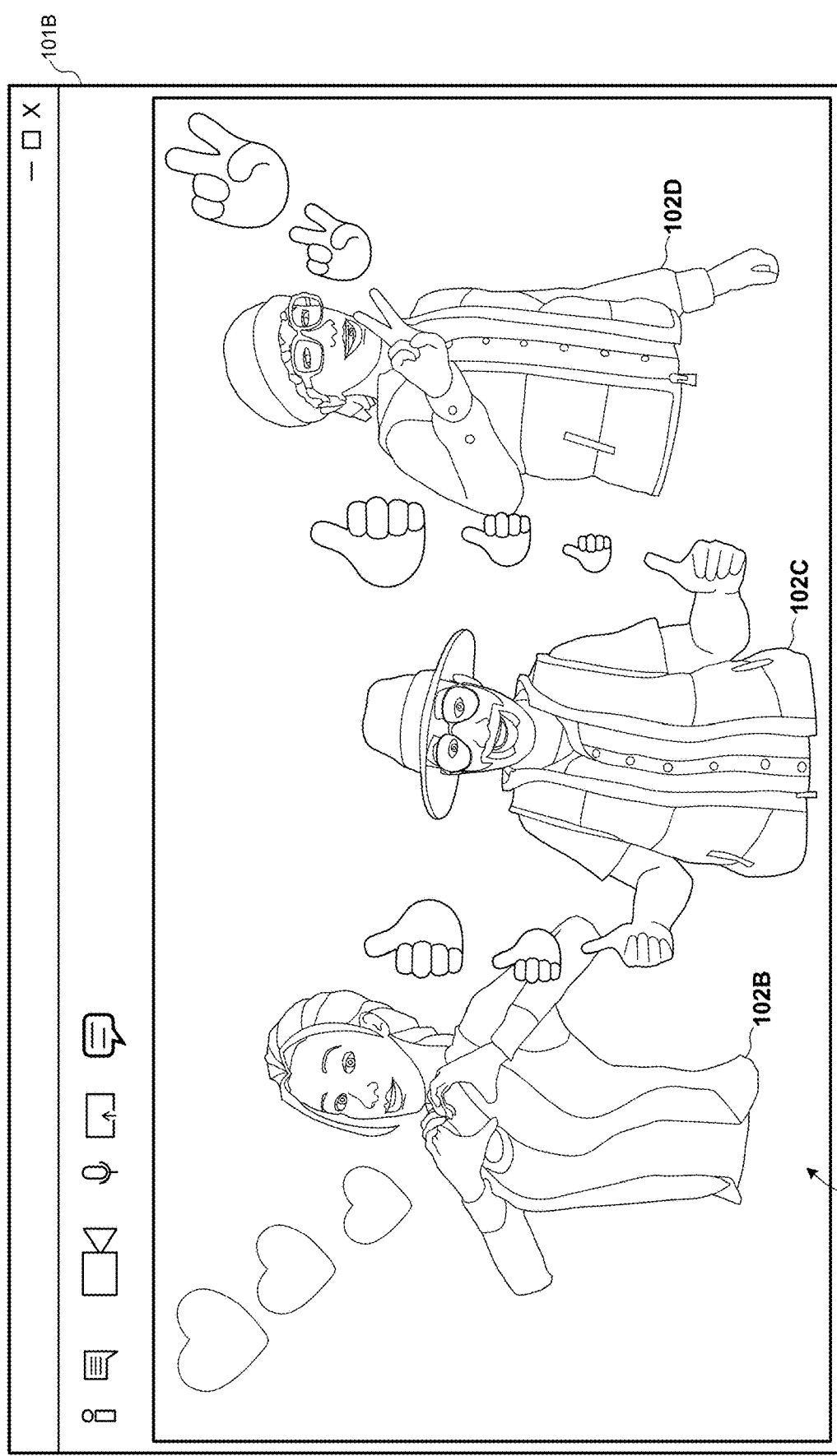
FIG. 3B shows a second user interface arrangement displaying generated media showing a stimulus notification that shows a group activity.

FIG. 3A and FIG. 3B show aspects of a first user interface arrangement 101A that transitions to a second user interface arrangement 101B having a stimulus notification in response to one or more triggers disclosed herein. In general, the transition of the user interface starts with a user interface that is displayed during an online meeting, an arrangement that shows shared content, videos and images of meeting participants, and other shared content, e.g., messages, reactions, gestures, etc. In response to the detection of an event that meets the criteria described here, the first user interface arrangement 101A transitions to a second user interface arrangement 101B that displays a stimulus notification.

In one illustrative example, the first user interface arrangement 101A of FIG. 3A comprises a content display region 301 and a presenter display region 302. Each person can be displayed in user interface as two-dimensional 2D images or each user can be displayed in a user interface as a three-dimensional representation, e.g., an avatar. The 3D representation may be a static model or a dynamic model that is animated in real-time responsive to a user input. Although this example illustrates a user interface with users displayed as 2D images, some of which can include live video renderings, it can be appreciated that the techniques disclosed herein can apply to other forms of representations, videos or other types of renderings. The system can generate a user interface showing aspects of the communication session to each of the meeting participants, e.g., users having computers 11 that are part of a communication session. In the example of FIG. 3A, the first user interface arrangement 101A can include a number of renderings 102 of the meeting attendees. This example is provided for illustrative purposes and is not to be construed as limiting. It can be appreciated that any user interface arrangement displaying content people or other images can be utilized with the techniques disclosed herein.

FIG. 3B shows a second user interface arrangement 101B that shows a stimulus notification 223 in the form of a rendering of the media content 222 indicating user activity associated with the subset 221 of users 10B-10D. In this example, renderings 102 (102B, 102C, and 102D) of representatives of each active user are depicted along with other indications of activity, e.g., emojis sent by the active users. These can be live videos of the actual users or live feeds of avatars illustrating expressions and gestures performed by the active users.

In general, the user interface arrangements shown herein are displayed to a person that meets a first set of criteria, e.g., they are considered as low activity. In this example the user interface arrangements 101 are displayed to the first of computing device 11A of the first user 10A that is associated with the first activity level 130A that meets the first preset condition 260, e.g., the first user receives the stimulus notification when activity data indicates they are low activity, e.g., an indication they are disengaged.

Figure 4:
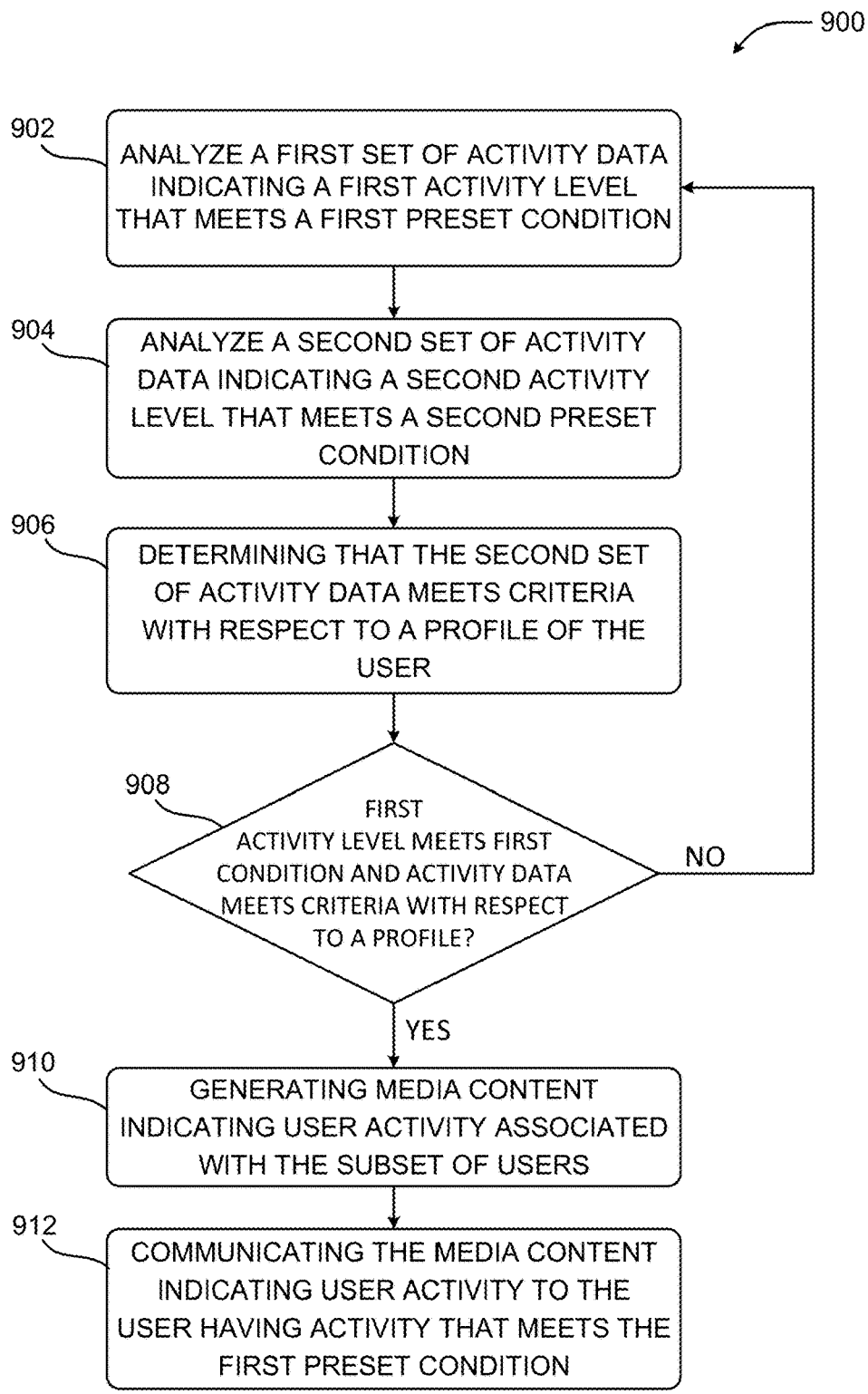
FIG. 4 is a flow diagram showing aspects of a routine for controlled delivery of a stimulus notification for promotion of user engagement of select users in a communication session of a plurality of users.

FIG. 4 is a diagram illustrating aspects of a routine 900 for controlled delivery of a stimulus notification 223 for promotion of user engagement of select users in a communication session of a plurality of users. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 4 and the other FIGURES can be implemented in association with the example presentation user interface(s) (UI) described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 900 starts at operation 902 where the system analyzes a first set of activity data 110 from a first computing device 11A associated with a first user 10A to identify inactive users. In the example of FIG. 1, the first user 10A is identified as an inactive user in response to determining that the first set of activity data 110 indicate a first activity level 130A associated with the first user 10A that meets a first preset condition 260. As shown in FIG. 1 (the left side of the figure), the first set of activity data 110 can be used to identify a passive user or a Passive Group of people, e.g., users deems as having low activity.

At operation 904, the system analyzes a second set of activity data 111 from a subset of computing devices 11B-11D associated with a subset 221 of users 10B-10D to identify active users. In the example of FIG. 1, the subset 221 of users 10B-10D is identified as the active users in response to determining that the second set of activity data 111 indicates a second activity level 131 that meets a second preset condition 261. As shown in FIG. 1 (the right side of the figure) the system can identify the active users, e.g., the active group cheering, making noise, providing inputs to generate emojis, etc.

At operation 906, the system can determine that the second set of activity data 111 from the subset of computing devices meets one or more criteria with respect a profile 120A of the user 10A. As described herein, the system can analyze the group activity and compare that activity to criteria and conditions in the profile data of the First User to determine a match between the activity data of the subset of users and the preferences in of a low activity user. For example, in profile shown in FIG. 1, User A only wants video of people on his team cheering, system only delivers stimulus notifications when that scenario is detected.

At operation 908, if the system determines that activity data 111 from the subset of computing devices does not meet the one or more criteria with respect a profile 120A of the user 10A, the routine exits or returns to any one of the previous operations to allow the system to track the activity of one or more users. However, at operation 908, if the system determines that activity data 111 from the subset of computing devices does meet the one or more criteria with respect the profile 120A of the user 10A, the routine continues to operation 910.

At operation 910, the system can generate media content 222 indicating user activity associated with the subset 221 of users 10B-10D affiliated with the second set of activity data 111 indicating the second activity level that meets the one or more criteria 271 with respect to the profile 120A of the user 10A. For example, the media data can include a video of users conducting the activity of the second set of activity data 111.

At operation 912, the system communicates the media content to a client for display. These operations also cause a display of the stimulus notification 223 comprising the media content 222 indicating user activity associated with the subset 221 of users 10B-10D. Media content indicating user activity can mean either depicting the activity or describing the activity in text or other means of communication. The stimulus notification 223 is displayed on the first of computing device 11A of the first user 10A that is associated with the first activity level 130A that meets the first preset condition 260. FIG. 3B shows an example of the user interface displaying the stimulus notification 223 on the computing devices of the users who are deemed as the passive group, e.g., the "low activity" users.

In the operations described herein, security of a system is improved by controlling access permissions based on the detected events. For example, the system can modify access permissions 260 that restrict users from accessing the media content generated from activity data to modified access permissions 261 that permits the first computing device 11A associated with a first user 10A to access the media content generated from activity data. The modification is in response to determining that the first set of activity data indicates the first activity level 130A associated with the first user 10A meets the first preset condition 260.

In some embodiments, access permissions are sent to the "inactive user" and only active until the second group activity stops, e.g., the system changes the permissions back to the original state. For example, the system can modify access permissions 260 that restrict users from accessing the media content generated from activity data to modified access permissions 261 that permits the first computing device 11A associated with a first user 10A to access the media content generated from activity data. The modification is in response to determining that the first set of activity data indicates the first activity level 130A associated with the first user 10A meets the first preset condition 260. The operations can also include communicating the modified access permissions 261 to the first computing device 11A. The modified access permissions causing the first computing device to display the media content 222 indicating user activity associated with the subset 221 of users. Thus, the modified access permissions revert back to the access permissions 260 that restrict users from accessing the media content in response to determining that the second set of activity data 111 indicates that the second activity level 131 no longer meets the second preset condition 261. This means that when the active users are no longer active, according to the thresholds and criteria, which can include the high threshold and/or the criteria of the first user, the system can revoke the permissions to view the generated media content when the active users are no longer performing the preferred activities defined in the recipient's profile.

For the identification of an "inactive" user, the system may perform operations where the first activity level meets the first preset condition when the first activity level is below an inactive threshold level, wherein first activity level is based on a quantity or type user inputs to the first computing device. This means movement detected a web camera directed to the user, activity in sharing content, activity in sharing emojis or text gestures, movement of an avatar, or any other activity invoked by a first set of users.

For the identification of an "active" user, the system may include operations where the second activity level meets the second preset condition when the second activity level is above an active user threshold level. This means movement detected a web camera directed to the user, activity in sharing content, activity in sharing emojis or text gestures, movement of an avatar, or any other activity invoked by a first set of users.

In some embodiments, the "Active" User matches the activity of the recipient's Profile when the activity type of the active user, e.g., clapping, cheering, or a specified emoji, is identified in the profile. The system may perform operations where the second set of activity data 111 from the subset of computing devices meets the one or more criteria 271 with respect to the profile 120A of the user 10A when the activity data indicates an activity type that is identified in the profile. In some embodiments, the "Active" User matches the activity of the recipient's Profile when a quantity of activity, e.g., quantity of clapping, cheering, or emojis, exceeds a threshold in the profile. In such embodiments, the second set of activity data 111 from the subset of computing devices meets the one or more criteria 271 with respect to the profile 120A of the user 10A when the activity data indicates a quantity of activity that exceeds an activity threshold stored in the profile of the user. In some embodiments, the system may perform operations where the second set of activity data 111 from the subset of computing devices meets the one or more criteria 271 with respect to the profile 120A of the user 10A when the activity data indicates an activity type and an activity quantity that are both identified in the profile. Thus, a profile can require both a specific activity type and a quantity, and the system only generates media content of the activity when both conditions are met.

Figure 5:
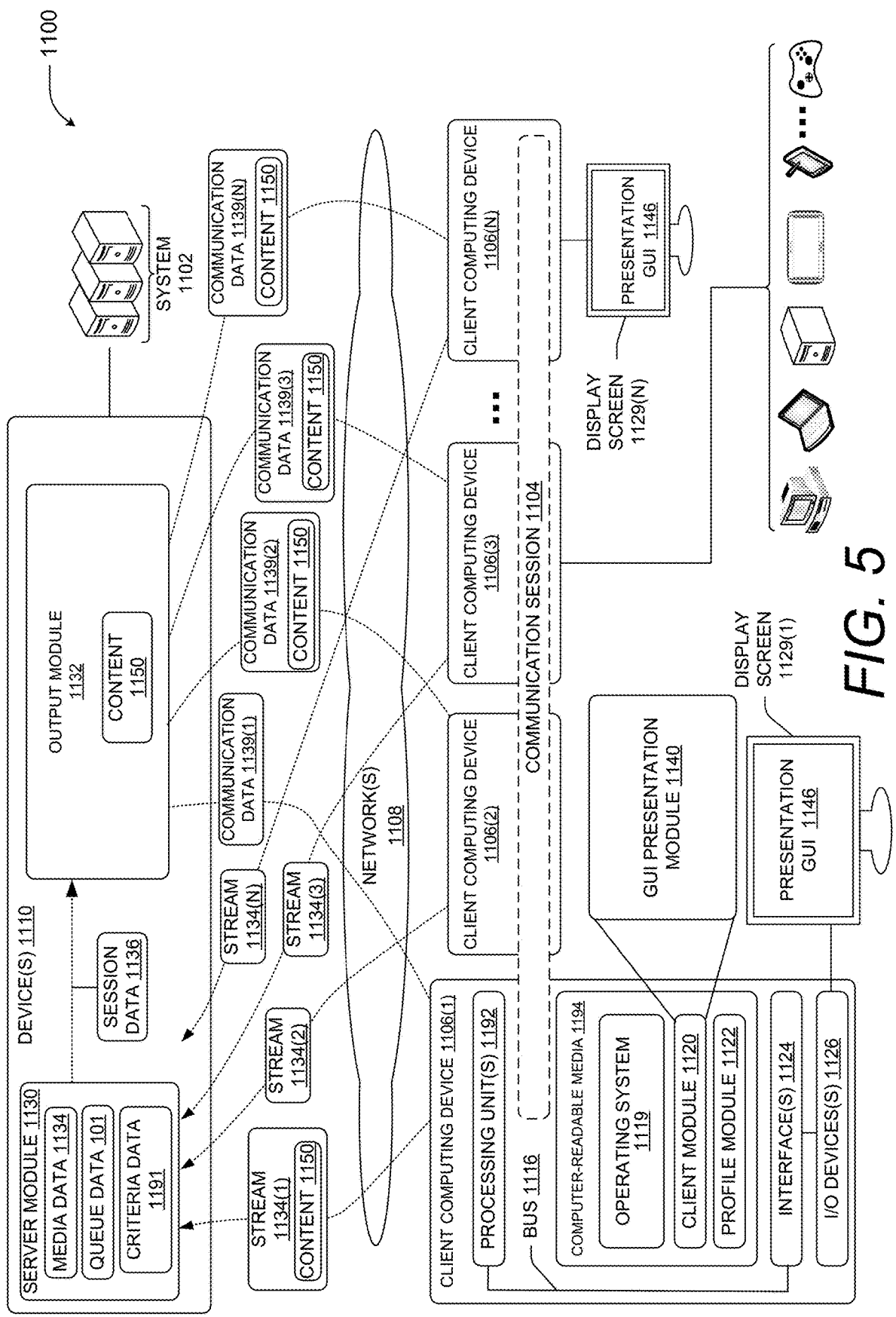
FIG. 5 is a diagram illustrating a distributed computing environment capable of implementing aspects of the techniques and technologies presented herein.

FIG. 5 is a diagram illustrating an example environment 1100 in which a system 1102 (system 100 of FIG. 1) can implement the techniques disclosed herein. In some implementations, a system 1102 may function to collect, analyze, and share data defining one or more objects that are displayed to users of a communication session 1104. As illustrated, the communication session 1104 may be implemented between a number of client computing devices 1106(1) through 1106(N) (where N is a number having a value of two or greater) that are associated with the system 1102 or are part of the system 1102. The client computing devices 1106(1) through 1106(N) enable users, also referred to as individuals, to participate in the communication session 1104.

In this example, the communication session 1104 is hosted, over one or more network(s) 1108, by the system 1102. That is, the system 1102 can provide a service that enables users of the client computing devices 1106(1) through 1106(N) to participate in the communication session 1104 (e.g., via a live viewing and/or a recorded viewing). Consequently, a "participant" to the communication session 1104 can comprise a user and/or a client computing device (e.g., multiple users may be in a room participating in a communication session via the use of a single client computing device), each of which can communicate with other participants. As an alternative, the communication session 1104 can be hosted by one of the client computing devices 1106(1) through 1106(N) utilizing peer-to-peer technologies. The system 1102 can also host chat conversations and other team collaboration functionality (e.g., as part of an application suite).

In some implementations, such chat conversations and other team collaboration functionality are considered external communication sessions distinct from the communication session 1104. A computerized agent configured to collect participant data in the communication session 1104 may be able to link to such external communication sessions. Therefore, the computerized agent may receive information, such as date, time, session particulars, and the like, that enables connectivity to such external communication sessions. In one example, a chat conversation can be conducted in accordance with the communication session 1104. Additionally, the system 1102 may host the communication session 1104, which includes at least a plurality of participants co-located at a meeting location, such as a meeting room or auditorium, or located in disparate locations.

In examples described herein, client computing devices 1106(1) through 1106(N) participating in the communication session 1104 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that captures the appearance and speech of a user participating in the communication session). In some implementations, the video feeds may comprise such audio and visual data, one or more still images, and/or one or more avatars. The one or more still images may also comprise one or more avatars.

Another example of an individual stream of live and/or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live and/or recorded content within the communication data enable a remote meeting to be facilitated between a group of people and the sharing of content within the group of people. In some implementations, the various streams of live and/or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 1104 live as activity occurs, or alternatively, via a recording at a later time after the activity occurs. In examples described herein, client computing devices 1106(1) through 1106(N) participating in the communication session 1104 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee of a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 1102 includes device(s) 1110. The device(s) 1110 and/or other components of the system 1102 can include distributed computing resources that communicate with one another and/or with the client computing devices 1106(1) through 1106(N) via the one or more network(s) 1108. In some examples, the system 1102 may be an independent system that is tasked with managing aspects of one or more communication sessions such as communication session 1104. As an example, the system 1102 may be managed by entities such as SLACK, WEBEX, GOTOMEETING, GOOGLE HANGOUTS, etc.

Network(s) 1108 may include, for example, public networks such as the Internet, private networks such as an institutional and/or personal intranet, or some combination of private and public networks. Network(s) 1108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 1108 may utilize communications protocols, including packet-based and/or datagram-based protocols such as Internet protocol ("IP"), transmission control protocol ("TCP"), user datagram protocol ("UDP"), or other types of protocols. Moreover, network(s) 1108 may also include a number of devices that facilitate network communications and/or form a hardware basis for the networks, such as switches, routers, gateways, access points, firewalls, base stations, repeaters, backbone devices, and the like.

In some examples, network(s) 1108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 1110 may include one or more computing devices that operate in a cluster or other grouped configuration to share resources, balance load, increase performance, provide fail-over support or redundancy, or for other purposes. For instance, device(s) 1110 may belong to a variety of classes of devices such as traditional server-type devices, desktop computer-type devices, and/or mobile-type devices. Thus, although illustrated as a single type of device or a server-type device, device(s) 1110 may include a diverse variety of device types and are not limited to a particular type of device. Device(s) 1110 may represent, but are not limited to, server computers, desktop computers, web-server computers, personal computers, mobile computers, laptop computers, tablet computers, or any other sort of computing device.

A client computing device (e.g., one of client computing device(s) 1106(1) through 1106(N)) may belong to a variety of classes of devices, which may be the same as, or different from, device(s) 1110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1106(1) through 1106(N) of the various classes and device types can represent any type of computing device having one or more data processing unit(s) 1192 operably connected to computer-readable media 1194 such as via a bus 1116, which in some instances can include one or more of a system bus, a data bus, an address bus, a PCI bus, a Mini-PCI bus, and any variety of local, peripheral, and/or independent buses.

Executable instructions stored on computer-readable media 1194 may include, for example, an operating system 1119, a client module 1120, a profile module 1122, and other modules, programs, or applications that are loadable and executable by data processing units(s) 1192.

Client computing device(s) 1106(1) through 1106(N) may also include one or more interface(s) 1124 to enable communications between client computing device(s) 1106(1) through 1106(N) and other networked devices, such as device(s) 1110, over network(s) 1108. Such network interface(s) 1124 may include one or more network interface controllers (NICs) or other types of transceiver devices to send and receive communications and/or data over a network. Moreover, client computing device(s) 1106(1) through 1106(N) can include input/output ("I/O") interfaces (devices) 1126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 5 illustrates that client computing device 1106(1) is in some way connected to a display device (e.g., a display screen 1129(1)), which can display a UI according to the techniques described herein.

In the example environment 1100 of FIG. 5, client computing devices 1106(1) through 1106(N) may use their respective client modules 1120 to connect with one another and/or other external device(s) in order to participate in the communication session 1104, or in order to contribute activity to a collaboration environment. For instance, a first user may utilize a client computing device 1106(1) to communicate with a second user of another client computing device 1106(2). When executing client modules 1120, the users may share data, which may cause the client computing device 1106(1) to connect to the system 1102 and/or the other client computing devices 1106(2) through 1106(N) over the network(s) 1108.

The client computing device(s) 1106(1) through 1106(N) may use their respective profile modules 1122 to generate participant profiles (not shown in FIG. 5) and provide the participant profiles to other client computing devices and/or to the device(s) 1110 of the system 1102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 5, the device(s) 1110 of the system 1102 include a server module 1130 and an output module 1132. In this example, the server module 1130 is configured to receive, from individual client computing devices such as client computing devices 1106(1) through 1106(N), media streams 1134(1) through 1134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 1130 is configured to receive a collection of various media streams 1134(1) through 1134(N) during a live viewing of the communication session 1104 (the collection being referred to herein as "media data 1134"). In some scenarios, not all of the client computing devices that participate in the communication session 1104 provide a media stream. For example, a client computing device may only be a consuming, or a "listening," device such that it only receives content associated with the communication session 1104 but does not provide any content to the communication session 1104. A communication session 1104 can have a start time and an end time, or a communication session 1104 can be ongoing. A communication session 1104 can also be categorized as an event and have stages, with each stage causing a computer to change roles for individual users as an event transitions through each stage.

In various examples, the server module 1130 can select aspects of the media streams 1134 that are to be shared with individual ones of the participating client computing devices 1106(1) through 1106(N). Consequently, the server module 1130 may be configured to generate session data 1136 based on the streams 1134 and/or pass the session data 1136 to the output module 1132. Then, the output module 1132 may communicate communication data 1139 to the client computing devices (e.g., client computing devices 1106(1) through 1106(N) participating in a live viewing of the communication session). The communication data 1139 may include video, audio, and/or other content data, provided by the output module 1132 based on content 1150 associated with the output module 1132 and based on received session data 1136. The device(s) 1110 of the system 1102 can also access queue data 101 described above in connection with FIG. 1, and criteria data 1191 for defining criteria and/or thresholds described herein. The criteria data 1191 can also include machine learning data accessible by a machine learning service or a machine learning module, which can be part of the server module 1130 or part of a remote machine learning service, such as those that are accessible by a public API at a site run by IBM, Google, or Microsoft.

As shown, the output module 1132 transmits communication data 1139(1) to client computing device 1106(1), and transmits communication data 1139(2) to client computing device 1106(2), and transmits communication data 1139(3) to client computing device 1106(3), etc. The communication data 1139 transmitted to the client computing devices can be the same or can be different (e.g., positioning of streams of content within a user interface may vary from one device to the next).

In various implementations, the device(s) 1110 of the system 1102 and/or the client module 1120 can include GUI presentation module 1140. The GUI presentation module 1140 may be configured to analyze communication data 1139 that is for delivery to one or more of the client computing devices 1106. Specifically, the UI presentation module 1140, at the device(s) 1110 and/or the client computing device 1106, may analyze communication data 1139 to determine an appropriate manner for displaying video, image, and/or content on the display screen 1129 of an associated client computing device 1106. In some implementations, the GUI presentation module 1140 may provide video, images, and/or content to a presentation GUI 1146 rendered on the display screen 1129 of the associated client computing device 1106. The presentation GUI 1146 may be caused to be rendered on the display screen 1129 by the GUI presentation module 1140. The presentation GUI 1146 may include the video, images, and/or content analyzed by the GUI presentation module 1140.

In some implementations, the presentation GUI 1146 may include a plurality of sections or grids that may render or comprise video, image, and/or content for display on the display screen 1129. For example, a first section of the presentation GUI 1146 may include a video feed of a presenter or individual, and a second section of the presentation GUI 1146 may include a video feed of an individual consuming meeting information provided by the presenter or individual. The GUI presentation module 1140 may populate the first and second sections of the presentation GUI 1146 in a manner that properly imitates an environment experience that the presenter and the individual may be sharing.

In some implementations, the GUI presentation module 1140 may enlarge or provide a zoomed view of the individual represented by the video feed in order to highlight a reaction, such as a facial feature, the individual had to the presenter. In some implementations, the presentation GUI 1146 may include a video feed of a plurality of participants associated with a meeting, such as a general communication session. In other implementations, the presentation GUI 1146 may be associated with a channel, such as a chat channel, enterprise teams channel, or the like. Therefore, the presentation GUI 1146 may be associated with an external communication session that is different than the general communication session.

Figure 6:
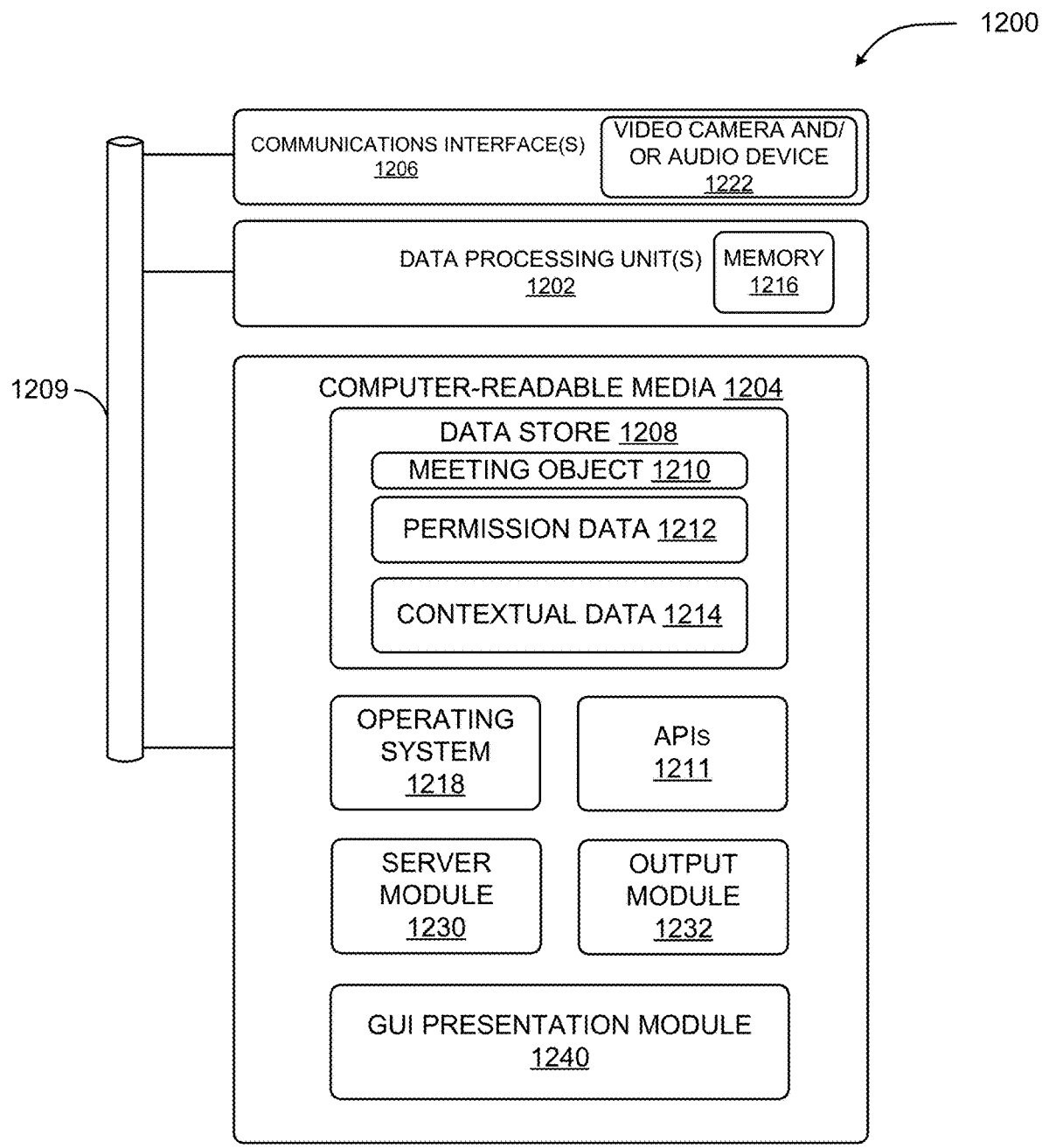
FIG. 6 is a computer architecture diagram illustrating a computing device architecture for a computing device capable of implementing aspects of the techniques and technologies presented herein.

FIG. 6 illustrates a diagram that shows example components of an example device 1200 (also referred to herein as a "computing device" or a "device") configured to generate and process data for some of the user interfaces disclosed herein. The device 1200 may generate data that may include one or more sections that may render or comprise video, images, and/or content for display on the display screen 1129. The device 1200 may represent one of the device(s) described herein. Additionally, or alternatively, the device 1200 may represent one of the client computing devices 1106.

As illustrated, the device 1200 includes one or more data processing unit(s) 1202, computer-readable media 1204 (also referred to herein as computer storage medium 1204), and communication interface(s) 1206. The components of the device 1200 are operatively connected, for example, via a bus 1209, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1202 and/or data processing unit(s) 1192, may represent, for example, a CPU-type data processing unit, a GPU-type data processing unit, a field-programmable gate array ("FPGA"), another class of digital signal processors ("DSPs"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1204 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. "Computer storage media," "non-transitory computer storage media," or "non-transitory computer-readable media" may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media or variants of this term noted above includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or any storage medium that can be used to locally store and maintain information for access at a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1206 may represent, for example, network interface controllers ("NICs") or other types of transceiver devices to send and receive communications over a network. Furthermore, the communication interface(s) 1206 may include one or more video cameras and/or audio devices 1222 to enable generation of video feeds and/or still images, and so forth.

In the illustrated example, computer-readable media 1204 includes a data store 1208. In some examples, the data store 1208 includes data storage such as a database, data warehouse, or other type of structured or unstructured data storage. In some examples, the data store 1208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1208 may store data for the operations of processes, applications, components, and/or modules stored in computer-readable media 1204 and/or executed by data processing unit(s) 1202 and/or accelerator(s). For instance, in some examples, the data store 1208 may store a meeting object 1210, a permission data 1212, and/or other data. The meeting object 1210 can include a total number of participants (e.g., users and/or client computing devices) in a communication session, activity that occurs in the communication session, a list of invitees to the communication session, and/or other data related to when and how the communication session is conducted or hosted. This object can also define subgroups, members of subgroups, and other user information. The permission data 1212 stores all access rights for each user, e.g., whether a computer of a user can receive audio or video streams from specific computers or send or video streams to specific computers. The data store 1208 may also include contextual data 1214, which can include any information that defines the activity of a user, criteria, or thresholds disclosed herein.

Alternately, some or all of the above-referenced data can be stored on separate memories 1216 on board one or more data processing unit(s) 1202 such as a memory on board a CPU-type processor, a GPU-type processor, an FPGA-type accelerator, a DSP-type accelerator, and/or another accelerator. In this example, the computer-readable media 1204 also includes an operating system 1218 and application programming interface(s) 1210 (APIs) configured to expose the functionality and the data of the device 1200 to other devices. Additionally, the computer-readable media 1204 includes one or more modules such as the server module 1230, the output module 1232, and the GUI presentation module 1240, although the number of illustrated modules is just an example, and the number may vary higher or lower. That is, functionality described herein in association with the illustrated modules may be performed by a fewer number of modules or a larger number of modules on one device or spread across multiple devices.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof. In addition, the words "that" or "if" can used interchangeably. Thus, a phrase such as "determining that criteria is satisfied" can be also interpreted as "determining if criteria is satisfied" and vice versa.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

I claim:

1. A method, executed by a computing system, for controlled delivery of a stimulus notification for promotion of user engagement of select users in a communication session of a plurality of users, comprising:
   analyzing a first set of activity data from a first computing device associated with a first user to identify inactive users, wherein the first user is identified as an inactive user in response to determining that the first set of activity data indicate a first activity level associated with the first user that meets a first preset condition;
   analyzing a second set of activity data from a subset of computing devices associated with a subset of users to identify active users, wherein the subset of users is identified as the active users in response to determining that the second set of activity data indicates a second activity level that meets a second preset condition; and
   determining that the second set of activity data from the subset of computing devices meets one or more criteria with respect a profile of the user;
   in response to determining that the first activity level meets the first preset condition, and in response to determining that the second set of activity data from the subset of computing devices meets one or more criteria with respect to a profile of the user:
      generating media content indicating user activity associated with the subset of users affiliated with the second set of activity data indicating the second activity level that meets the one or more criteria with respect to the profile of the user, and
      causing a display of the stimulus notification comprising the media content indicating user activity associated with the subset of users, wherein the stimulus notification is displayed on the first of computing device of the first user that is associated with the first activity level that meets the first preset condition.

2. The method of claim 1, further comprising: modifying access permissions that restrict users from accessing the media content generated from activity data to modified access permissions that permits the first computing device associated with a first user to access the media content generated from activity data, wherein the modification is in response to determining that the first set of activity data indicates the first activity level associated with the first user meets the first preset condition.

3. The method of claim 1, further comprising:
   modifying access permissions that restrict users from accessing the media content generated from activity data to modified access permissions that permits the first computing device associated with a first user to access the media content generated from activity data, wherein the modification is in response to determining that the first set of activity data indicates the first activity level associated with the first user meets the first preset condition; and communicating the modified access permissions to the first computing device, the modified access permissions causing the first computing device to display the media content indicating user activity associated with the subset of users, wherein the modified access permissions revert back to the access permissions that restrict users from accessing the media content in response to determining that the second set of activity data indicates that the second activity level no longer meets the second preset condition.

4. The method of claim 1, wherein the first activity level meets the first preset condition when the first activity level is below an inactive threshold level, wherein first activity level is based on a quantity or type user inputs to the first computing device.

5. The method of claim 1, wherein the second activity level meets the second preset condition when the second activity level is above an active user threshold level.

6. The method of claim 1, wherein the second set of activity data from the subset of computing devices meets the one or more criteria with respect to the profile of the user when the activity data indicates an activity type that is identified in the profile.

7. The method of claim 1, wherein the second set of activity data from the subset of computing devices meets the one or more criteria with respect to the profile of the user when the activity data indicates a quantity of activity that exceeds an activity threshold stored in the profile of the user.

8. The method of claim 1, wherein the media content shows user activity performed by the subset of users, and wherein the stimulus notification is displayed on the first of computing device of the first user that is associated with the first activity level that meets the first preset condition, wherein the stimulus notification is not displayed on the subset of computing devices associated with the active users.

9. The method of claim 1, wherein generating the media content indicating the user activity of the subset of users includes capturing one or more gesture inputs performed by the subset of users, and generating media content showing user activity performed by the subset of users, in response to determining that the first activity level of a first user meets the first preset condition, and in response to determining that the second set of activity data from the subset of computing devices meets one or more criteria with respect to a profile of the user.

10. The method of claim 1, wherein the first activity level associated with the first user meets the first preset condition when the first activity level is below one or more activity thresholds, wherein the second activity level meets the second preset condition when the second activity level is above one or more activity thresholds.

11. A computing device for controlled delivery of a stimulus notification for promotion of user engagement of select users in a communication session of a plurality of users, the computing device comprising:
one or more processing units; and
a computer-readable storage medium having encoded thereon computer-executable instructions to cause the one or more processing units to:

analyze a first set of activity data from a first computing device associated with a first user to identify inactive users, wherein the first user is identified as an inactive user in response to determining that the first set of activity data indicate a first activity level associated with the first user that meets a first preset condition;

analyze a second set of activity data from a subset of computing devices associated with a subset of users to identify active users, wherein the subset of users is identified as the active users in response to determining that the second set of activity data indicates a second activity level that meets a second preset condition; and determine that the second set of activity data from the subset of computing devices meets one or more criteria with respect a profile of the user;

in response to determining that the first activity level meets the first preset condition, and in response to determining that the second set of activity data from the subset of computing devices meets one or more criteria with respect to a profile of the user:

generate media content indicating user activity associated with the subset of users affiliated with the second set of activity data indicating the second activity level that meets the one or more criteria with respect to the profile of the user, and cause a display of the stimulus notification comprising the media content indicating user activity associated with the subset of users, wherein the stimulus notification is displayed on the first of computing device of the first user that is associated with the first activity level that meets the first preset condition.

12. The computing device of claim 11, wherein the computer-executable instructions cause the one or more processing units to: modify access permissions that restrict users from accessing the media content generated from activity data to modified access permissions that permits the first computing device associated with a first user to access the media content generated from activity data, wherein the modification is in response to determining that the first set of activity data indicates the first activity level associated with the first user meets the first preset condition.

13. The computing device of claim 11, wherein the computer-executable instructions cause the one or more processing units to:

modify access permissions that restrict users from accessing the media content generated from activity data to modified access permissions that permits the first computing device associated with a first user to access the media content generated from activity data, wherein the modification is in response to determining that the first set of activity data indicates the first activity level associated with the first user meets the first preset condition; and communicate the modified access permissions to the first computing device, the modified access permissions causing the first computing device to display the media content indicating user activity associated with the subset of users, wherein the modified access permissions revert back to the access permissions that restrict users from accessing the media content in response to determining that the second set of activity data indicates that the second activity level no longer meets the second preset condition.

14. The computing device of claim 11, wherein the first activity level meets the first preset condition when the first activity level is below an inactive threshold level, wherein first activity level is based on a quantity or type user inputs to the first computing device.

15. The computing device of claim 11, wherein the second activity level meets the second preset condition when the second activity level is above an active user threshold level.

16. The computing device of claim 11, wherein the second set of activity data from the subset of computing devices meets the one or more criteria with respect to the profile of the user when the activity data indicates a quantity of activity that exceeds an activity threshold stored in the profile of the user.

17. A computer-readable storage medium having encoded thereon computer-executable instructions for causing controlled delivery of a stimulus notification for promotion of user engagement of select users in a communication session of a plurality of users, the computer-executable instructions to cause the one or more processing units of a system to:
  analyze a first set of activity data from a first computing device associated with a first user to identify inactive users, wherein the first user is identified as an inactive user in response to determining that the first set of activity data indicate a first activity level associated with the first user that meets a first preset condition;
  analyze a second set of activity data from a subset of computing devices associated with a subset of users to identify active users, wherein the subset of users is identified as the active users in response to determining that the second set of activity data indicates a second activity level that meets a second preset condition; and
  determine that the second set of activity data from the subset of computing devices meets one or more criteria with respect a profile of the user;
  in response to determining that the first activity level meets the first preset condition, and in response to determining that the second set of activity data from the subset of computing devices meets one or more criteria with respect to a profile of the user:
  generate media content indicating user activity associated with the subset of users affiliated with the second set of activity data indicating the second activity level that meets the one or more criteria with respect to the profile of the user, and
  cause a display of the stimulus notification comprising the media content indicating user activity associated with the subset of users, wherein the stimulus notification is displayed on the first of computing device of the first user that is associated with the first activity level that meets the first preset condition.

18. The computer-readable storage medium of claim 17, wherein the computer-executable instructions cause the one or more processing units to: modify access permissions that restrict users from accessing the media content generated from activity data to modified access permissions that permits the first computing device associated with a first user to access the media content generated from activity data, wherein the modification is in response to determining that the first set of activity data indicates the first activity level associated with the first user meets the first preset condition.

19. The computer-readable storage medium of claim 17, wherein the computer-executable instructions cause the one or more processing units to:
  modify access permissions that restrict users from accessing the media content generated from activity data to modified access permissions that permits the first computing device associated with a first user to access the media content generated from activity data, wherein the modification is in response to determining that the first set of activity data indicates the first activity level associated with the first user meets the first preset condition; and
  communicate the modified access permissions to the first computing device, the modified access permissions causing the first computing device to display the media content indicating user activity associated with the subset of users, wherein the modified access permissions revert back to the access permissions that restrict users from accessing the media content in response to determining that the second set of activity data indicates that the second activity level no longer meets the second preset condition.

20. The computer-readable storage medium of claim 17, wherein the first activity level meets the first preset condition when the first activity level is below an inactive threshold level, wherein first activity level is based on a quantity or type user inputs to the first computing device.

\* \* \* \* \*